(12) United States Patent
Chapman et al.

(10) Patent No.: US 7,029,187 B2
(45) Date of Patent: Apr. 18, 2006

(54) OPTICAL FIBER SPLICE MANUFACTURING PROCESS

(75) Inventors: Thomas R. Chapman, Corning, NY (US); L. Kirk Klingensmith, Corning, NY (US)

(73) Assignee: Corning Incorporated, Corning, NY (US)

( * ) Notice: Subject to any disclaimer, the term of this patent is extended or adjusted under 35 U.S.C. 154(b) by 847 days.

(21) Appl. No.: 10/159,908

(22) Filed: May 31, 2002

(65) Prior Publication Data

US 2003/0223712 A1 Dec. 4, 2003

(51) Int. Cl.
*G02B 6/255* (2006.01)

(52) U.S. Cl. .............................. 385/96; 385/97; 385/98

(58) Field of Classification Search ...................... None
See application file for complete search history.

(56) References Cited

U.S. PATENT DOCUMENTS

| | | | |
|---|---|---|---|
| 5,649,040 A * | 7/1997 | Ljungqvist et al. ............ 385/95 |
| 6,088,503 A * | 7/2000 | Chandler et al. ........... 385/135 |
| 6,092,394 A * | 7/2000 | Backer et al. ................. 65/377 |
| 6,463,872 B1 * | 10/2002 | Thompson ................. 118/50.1 |
| 2001/0014198 A1 * | 8/2001 | Walters et al. ................. 385/96 |
| 2002/0009271 A1 * | 1/2002 | Herve et al. ................... 385/98 |
| 2002/0145731 A1 * | 10/2002 | Kritler et al. ............... 356/73.1 |
| 2003/0223712 A1 * | 12/2003 | Chapman et al. .............. 385/96 |
| 2004/0165834 A1 * | 8/2004 | Bryant et al. ................. 385/84 |
| 2004/0165841 A1 * | 8/2004 | Fernald et al. ................ 385/96 |
| 2005/0180703 A1 * | 8/2005 | Ruegenberg ................. 385/96 |

* cited by examiner

*Primary Examiner*—Frank G. Font
*Assistant Examiner*—James P. Hughes
(74) *Attorney, Agent, or Firm*—Ronald J. Paglierani

(57) ABSTRACT

A method for splicing optical fibers includes securing a first optical fiber and a second optical fiber within an apparatus, stripping a coating from about the first optical fiber by a first laser beam generated from at least one laser, and stripping a coating from about the second optical fiber by the first laser beam. The method also includes cleaving an end of the first optical fiber via a second beam from the laser, and cleaving an end of the second optical fiber via the second laser beam. The method further includes splicing the ends of the optical fibers together via a third laser beam from the laser, thereby creating a fused connection between the first optical fiber and the second optical fiber, and removing the first and second optical fibers from within the apparatus.

37 Claims, 2 Drawing Sheets

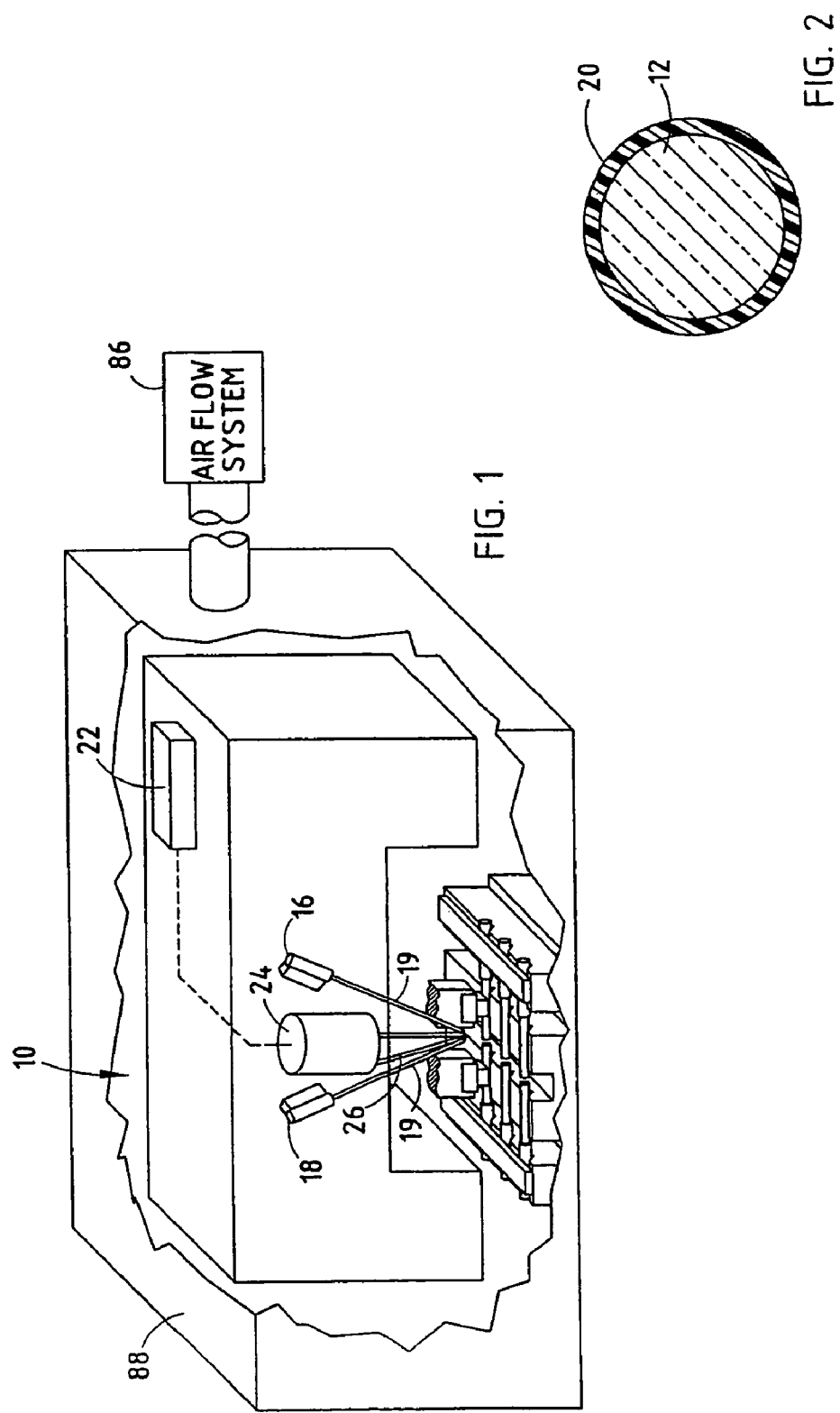

OPTICAL FIBER SPLICE MANUFACTURING PROCESS

BACKGROUND OF THE INVENTION

1. Field of the Invention

The invention is directed to a method and apparatus for splicing optical fibers, and more particularly, a highly efficient and accurate process and apparatus for splicing optical fibers.

2. Technical Background

The process of fusion splicing is utilized in manufacturing a wide variety of optical devices, including photonic devices, fiber gain modules, dispersion compensation modules, multi-clad couplers, micro-optic components, etc., as well as in the installation of fiber spans for telecommunications networks. In most applications, the fusion splicing process is utilized to achieve a glass-to-glass bond so that an optical signal may be effectively coupled across the interface with minimal loss.

The process of splicing together optical fibers and splicing optical fibers to optical components, or optical components to one another typically includes several manual steps involving extensive fiber handling between multiple pieces of processing equipment. Heretofore, the process of splicing optical fibers has included removing the polymer coating from the fiber cladding via mechanical, chemical, or thermal removal techniques. Typically, this step is accomplished using a hand-held mechanical stripping device, or a bench-top mounted thermal stripper. The exposed ends of the fibers are then cleaned by wiping the ends with an alcohol-soaked optical cleaning tissue or immersion of the fiber ends into an alcohol rinse bath that incorporates ultrasonic agitation. The fibers are then inserted into a cleaving device where the fiber ends are cleaved at a 90° angle to the optical axis of the fiber. The fibers are then manually removed from the cleaving device and inserted into an arc fusion splicer where the fiber ends are then spliced together. In most applications, the splicing process is accomplished with an arc-plasma generated between two tungsten electrodes. The fibers are then manually removed from the splicing apparatus and placed within a splice protection apparatus where the splice region between the two fibers is protected via a polymer coating that is either heat shrunk over the splice region, or injected around the fiber and UV-cured to recoat the exposed glass. Each of these process steps therefore requires manual loading, human operation, and manual unloading. The manipulation and handling of the fibers throughout and between each process step compromises fiber strength and may lead to failure during subsequent use.

A process for splicing optical fiber and other optical components that reduces the amount of manual labor required, while simultaneously increasing the accuracy of the process and the fiber strength resulting therefrom is therefore desired.

SUMMARY OF THE INVENTION

This invention meets the need for a method and apparatus for splicing optical components, and specifically optical fibers, that offers benefits with respect to efficiency, accuracy and integrity of the resultant optical splice between the optical components.

One embodiment of the present invention is a method for splicing optical fibers. The method includes securing a first optical fiber and a second optical fiber within an apparatus. The method further includes stripping a coating from about the first optical fiber via a first laser beam generated from at least one laser. The method further includes stripping a coating from about the second optical fiber via the first laser beam. The method further includes cleaving an end of the first optical fiber via a second laser beam from the at least one laser. The method further includes cleaving an end of the second optical fiber via the second laser beam. The method further includes splicing the ends of the optical fibers together via a third laser beam from the at least one laser, thereby creating a fused connection between the first optical fiber and the second optical fiber, and removing the first and second optical fibers from within the apparatus.

In another embodiment, the present invention includes a method for splicing a first optical fiber to a second optical fiber that includes securing the first optical fiber and the second optical fiber within an apparatus, stripping a first coating from about the first optical fiber via a first laser beam generated from at least one lasing apparatus, and stripping a second coating from about the second optical fiber via the first laser beam. The method also includes cleaving an end of the first optical fiber via a second laser beam generated from the at least one lasing apparatus, cleaving an end of the second optical fiber via the second laser beam, and splicing the ends of the optical fibers together by longitudinally aligning the fibers, heating the ends of the fibers with a third laser beam generated from the at least one lasing apparatus, and pressing the ends of the fibers together, thereby creating a fused connection between the first optical fiber and the second optical fiber. The method further includes coating the fused connection with a third coating by shrink wrapping the third coating about the fused connection via a fourth laser beam generated from the at least one lasing apparatus, removing debris created during the stripping, cleaving, splicing and coating steps by regulating the air flow about the first and second optical fibers, and removing the first and second optical fibers from within the apparatus.

In another embodiment, the present invention includes a splicing apparatus for splicing optical fibers. The apparatus includes a clamp for retaining a first optical fiber and a second optical fiber within the splicing apparatus; and at least one laser. The at least one laser is adapted to emit a first laser beam for stripping a coating from about the first and second optical fibers while the first and second optical fibers are retained by the clamp, a second laser beam for cleaving an end of the first optical fiber and an end of the second optical fiber while the first and second optical fibers are retained by the clamp, and a third laser beam for splicing the ends of the optical fibers together creating a fused connection therebetween while the first and second optical fibers are retained by the clamp.

Additional features and advantages of the invention will be set forth in the detailed description which follows and will be apparent to those skilled in the art from the description or recognized by practicing the invention as described in the description which follows together with the claims and appended drawings.

It is to be understood that the description herein is exemplary of the invention only and is intended to provide an overview for the understanding of the nature and character of the invention as it is defined by the claims. The accompanying drawings are included to provide a further understanding of the invention and are incorporated and constitute part of this specification. The drawings illustrate various features and embodiments of the invention which, together with their description serve to explain the principles and operation of the invention.

BRIEF DESCRIPTION OF THE DRAWINGS

FIG. 1 is a perspective, schematic view of a splicing apparatus embodying the present invention;

FIG. 2 is a cross-sectional end view of an optical fiber and associated outer coating.

DETAILED DESCRIPTION OF THE PREFERRED EMBODIMENT

Figure 3:
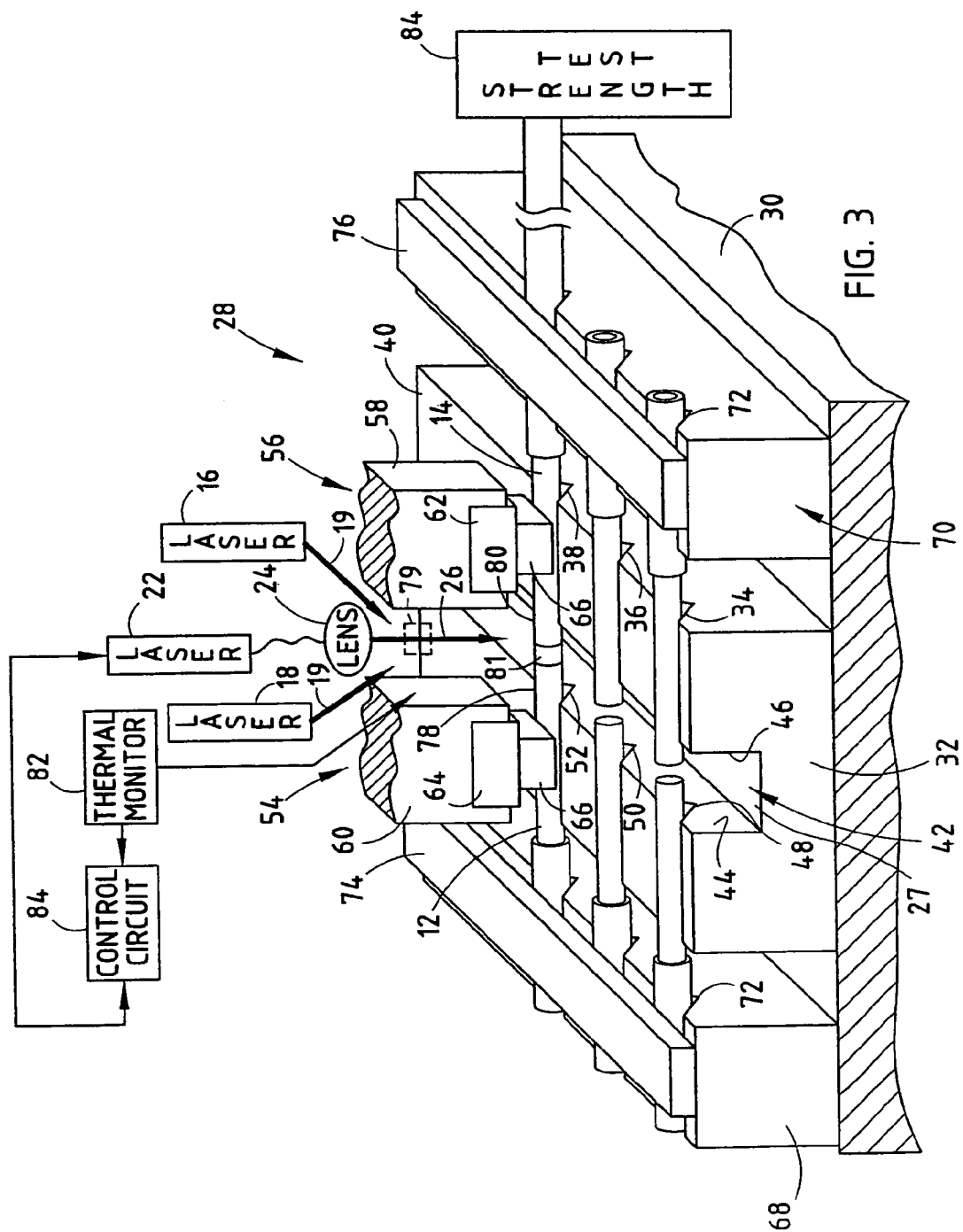
FIG. 3 is perspective, schematic view of a clamping assembly for retaining optical components within the splicing apparatus.

In FIG. 1, there is shown an optical component and/or optical fiber splicing apparatus 10 embodying the present invention. In the illustrated example, the splicing apparatus is adapted to splice a first optical fiber 12 (FIG. 3) with a second optical fiber 14. The splicing apparatus 10 includes a first lasing device or laser 16 and a second lasing device or laser 18 each adapted to emit a laser beam 19 for stripping a polymer coating 20 (FIG. 2) from about the optical fibers 12 and 14, as well as shrink wrapping a final polymer coating, as described below. The splicing apparatus 10 also includes a third lasing device or laser 22 optically coupled with a plurality of focalization optics 24 to emit a laser beam 26 for cleaving and splicing the optical fibers 12 and 14 together, as described below.

In operation, the optical fibers 12 and 14 are secured within the splicing apparatus 10 by a clamp assembly 28 that includes a stage 30 which provides X, Y and rotational alignment of the clamp assembly 28 with respect to laser beams 19 and 26. Thus, in a preferred embodiment of the invention, the lasers 16, 18 and 22, and the associated focalization optics 24 are held stationary and the stage 30 moves with the clamped optical fibers 12 and 14 in alignment under laser beams 19 and 26. The clamping assembly 28 includes a holder 32 having a plurality of precisely formed, parallel spaced grooves 34, 26 and 38. It should be noted that multiple grooves can be formed in the holder 32 to allow mass production of multiple splices. Grooves 34, 36 and 38 are formed within holder 32 such that the optical fiber 14 extends above an upper surface 40 of the holder 32. A generally rectangular channel 27 is formed traverse to the grooves 34, 36 and 38 to divide each of the grooves and provide a splicing channel 42 between a pair of sidewalls 44 and 46. The channel 42 has a width that provides an open work area for the laser splicing to occur. A pair of mating separate grooves 48, 50 and 52 are provided on an opposite side of the holder 32, and are precisely aligned for aligning first optical fibers 12 with second optical fibers 14. The clamp assembly 28 further includes a pair of resilient positioning arms 54 and 56 which comprise a micro-manipulator holder 58 and 60 gripping mounting blocks 62 and 64, respectively, each including an integrally molded block of resilient polymeric material 66, such as silicone rubber. The resilient material 66 grips an outer surface of the optical fibers 12 and 14 when the optical fibers 12 and 14 are secured within splicing apparatus 10. The clamp assembly 28 further includes secondary clamps 68 and 70, each including a plurality of grooves 72, similar to and aligned with grooves 34, 36, 38, 48, 50 and 52. The clamping arms 74 and 76 having a polymeric coating surface are placed above and abut the coating 20 of each of the optical fibers 12 and 14, thereby retaining the optical fibers 12 and 14 within the grooves 72 of the secondary clamps 68 and 70, respectively, It should be noted that although a particular clamping assembly is described herein other clamping assemblies and configurations may also be utilized.

The coating 20 is then stripped away from the ends 78 and 80 of the optical fibers 12 and 14, respectively, via the laser beam 19 as emitted from the first and second lasers 16 and 18. During the stripping steps, each laser beam 19 is preferably provided with a wavelength that is absorbed primarily by the coatings 20. More preferably, each laser beam 19 has a wavelength of about 10.6 µm for $CO_2$ lasers, within the range of from about 148 nm to about 380 nm for UV lasers, about 148 to about 250 nm for eximer lasers, and about 355 nm of Nd:vanadate lasers. Further, each laser beam 19 has a power of several hundred milliwatts.

The ends 78 and 80 of the optical fibers 12 and 14 are then cleaved via the focused laser beam 26 from the third laser 22. In the illustrated example, the third laser 22 is a $CO_2$ type laser, however, other lasers may be utilized within the splicing apparatus 10 depending upon the application. The ends 78 and 80 of the optical fibers 12 and 14 may be cleaved at any desired angle relative to the longitudinal axis of each of the optical fibers 12 and 14, however, the ends 78 and 80 are preferably cleaved at 90° angles to the central optical axis of each of the fibers 12 and 14. During the cleaving steps, the laser beam 26 preferably has a wavelength that is primarily absorbed by the optical fibers 12 and 14. Specifically, the laser beam 26 preferably has a wavelength of about 10.6 microns, and has a power within a range of from about 1 watt to about 10 watts.

The ends 78 and 80 of the optical fibers 12 and 14 are then spliced together via the laser beam 26 from the third laser 22. During the splicing step, the longitudinal axis of each of the optical fibers 12 and 14 are aligned with one another within the clamping assembly 28, and are then preheated via the laser beam 26. In an alternative embodiment, the ends 78 and 80 of the optical fibers 12 and 14 may be preheated to different comparable temperatures, thereby expanding the mode field diameter of the optical fibers 12 and 14, as is known in the art. The ends 78 and 80 of the optical fibers 12 and 14 are then pressed together and heated via the laser beam 26, thereby creating a fused connection 81 between the ends 78 and 80 of the optical fibers 12 and 14. During the splicing step, the laser beam 26 preferably has a wavelength that is primarily absorbed by the optical fibers 12 and 14. Specifically, during the splicing step, the laser beam 26 is preferably provided via an IR or $CO_2$ laser at a wavelength of about 10.6 µm and a power of less than or equal to 10 W. A thermal monitor 82 is used to monitor the temperature of the ends 78 and 80 and the fused connection 81 during the splicing step. A feedback loop within a control circuit 84 monitors the output of the thermal monitor 82 and controls the power output of the third laser device 22 to precisely control the laser beam 26.

In an alternative embodiment, the laser beams 19 and 26 may be split into multiple components during the stripping, cleaving, splicing, and coating steps via a laser splitting device 79, wherein the resultant components of the laser beam 19 and 26 contact the optical fibers 12 and 14, the coating 20 and the coating covering the fused connection 81 at different locations. It should be noted that any laser splitting device known in the art and compatible with the splicing apparatus 10 may be utilized therein.

The fused connection 81 between the ends 78 and 80 of the optical fibers 12 and 14 is then coated with a polymer coating similar to the polymer coating 20. Specifically, the polymer coating is placed about the fused connection and is shrink wrapped via the laser beams 19 from the first and second lasers 16 and 18. During the coating step, the laser beams 19 are preferably emitted at a wavelength that is primarily absorbed by the polymer coating being placed about the fused connection 81. Specifically, the laser beams 19, from the first and second lasers 16 and 18 during the coating step are each a UV laser or an IR laser with a diffused or rastered beam. Alternatively, the spliced connection 81 may be recoated with a liquid polymer and cured via an ultraviolet light.

As schematically illustrated by strength testing apparatus 84 in FIG. 3, the strength of the fused connection 81 between the optical fibers 12 and 14 is tested prior to removing the optical fibers 12 and 14 from the splicing apparatus 10. It should be noted that any method and system as known in the art adapted to test the strength of an optical fiber and compatible with the splicing apparatus 10 as described herein, may be utilized.

An airflow system 86 (FIG. 1) is utilized to control the airflow within a containment unit 88 surrounding the splicing apparatus 10. In the illustrated example, the airflow system ducts air through the containment unit 88, thereby removing debris from within the containment unit 88 and proximate ends 78 and 80 of the optical fibers 12 and 14 during the stripping, cleaving, splicing, and coating steps, thereby reducing the contamination to the fused connection 81 and increasing the optical reliability, accuracy and strength of the fused connection 81. Although the airflow system 86 as illustrated in FIG. 1 includes ducting the air from within a containment unit 88, it should be noted that other airflow systems may be utilized, including systems used within the open plan of a building and concentrating the airflow proximate the ends 78 and 80 as the process of splicing the optical fibers 12 and 14 is accomplished.

The optical splicing apparatus 10 and the process related thereto provides a highly efficient, and reduced cost method for splicing optical fibers and other optical components, while simultaneously increasing the accuracy of the related process, and the strength of the resultant optical splice. The process is directly applicable to fiber splicing and may be implemented in cable manufacturing as well as photonic component manufacturing. The process as disclosed herein eliminates the hazards associated with chemical stripping, as well as the hazards associated with handling the optical fibers, such as poking of the operator's skin during handling. The process improves the alignment capability by eliminating fiber motion, typically caused by electro-static forces in an arc-plasma process, minimizing strip length, provides a tighter cleave angle distribution, a shorter required lead length within a decreased workstation size. The process further eliminates the variability, rework and scrap associated with manual handling, reduces the variations in arc power and arc location associated with the previously used splicing processes, while providing a high reliability and control of the heat source, i.e., the lasers disclosed herein, thereby providing repeatability and reproducibility.

In the foregoing description, it will be readily appreciated by those skilled in the art that modifications may be made to the invention without departing from the concepts disclosed herein. Such modifications should be considered as included in the following claims, unless these claims by their language expressly state otherwise. It will become apparent to those skilled in the art that such modifications to the preferred embodiment of the invention as described herein can be made without departing from the spirits or scope of the invention as defined by the appended claims.

The invention claimed is:

1. A method for splicing optical fibers, comprising:
   securing a first optical fiber and a second optical fiber within an apparatus;
   stripping a coating from about the first optical fiber via a first laser beam generated from at least one laser;
   stripping a coating from about the second optical fiber via the first laser beam;
   cleaving an end of the first optical fiber via a second laser beam from the at least one laser;
   cleaving an end of the second optical fiber via the second laser beam;
   splicing the ends of the optical fibers together via a third laser beam from the at least one laser, thereby creating a fused connection between the first optical fiber and the second optical fiber; and
   removing the first and second optical fibers from within the apparatus.

2. The method of claim 1, wherein the stripping steps include providing the first laser beam at a first wavelength and a first power level, and wherein the cleaving steps include providing the second laser beam at a second wavelength that is different from the first wavelength and a second power level.

3. The method of claim 2, wherein the splicing step includes providing the third laser beam at a third wavelength that is substantially similar to the second wavelength, and a third power level that is different from the second power level.

4. The method of claim 1, wherein the stripping steps include generating the first laser beam with a first laser, and wherein the cleaving steps include generating the second laser beam with a second laser.

5. The method of claim 1, wherein the cleaving steps include generating the second laser beam and the splicing step includes generating the third laser beam with the same laser.

6. The method of claim 1, wherein the step of splicing the ends of the optical fibers includes aligning a central optical axis of each fiber with a central optical axis of the other fiber, providing a gap between the ends of the fibers, and preheating the ends of the fibers with the third laser beam.

7. The method of claim 6, wherein the cleaving steps include providing the second laser beam at a second wavelength and a second power level, and wherein the splicing step includes providing the third laser beam at a third wavelength that is substantially similar to the second wavelength, and a third power level that is different from the second power level.

8. The method of claim 6, wherein the step of splicing the ends of the optical fibers includes preheating the end of the first optical fiber to a different temperature than the end of the second optical fiber to expand the mode field of one or both fibers.

9. The method of claim 6, wherein the step of splicing the ends of the optical fibers includes controlling the temperature of the fused location via a feedback control loop that monitors the thermal emission of the fused location.

10. The method of claim 1 further including:
    removing debris created from the stripping, cleaving, splicing and coating steps, by regulating airflow about the fibers.

11. The method of claim 1, wherein the first laser beam of the stripping steps is absorbed primarily by the coatings about the first and second optical fibers.

12. The method of claim 1, wherein the third laser beam of the splicing step is absorbed primarily by the first and second optical fibers.

13. The method of claim 1, wherein the cleaving steps include cleaving the ends of the first and second optical fibers at a 90° angle to a longitudinal axis thereof.

14. The method of claim 1, further including:
coating the splice connection with a coating subsequent to splicing the ends of the optical fibers together and prior to removing the optical fibers from within the apparatus.

15. The method of claim 14, wherein the splice connection coating step includes shrink wrapping the coating about the splice connection.

16. The method of claim 14, wherein the coating step includes providing a fourth laser beam by the at least one laser, at a fourth wavelength that is substantially similar to the first wavelength, and at a fourth power level that is different from the first power level.

17. The method of claim 16, wherein the stripping steps include generating the first laser beam and the coating step includes generating the fourth laser beam with the same laser.

18. The method of claim 1, further including:
proof testing the fused connection between first and second optical fibers prior to removing the optical fibers from within the apparatus.

19. A method for splicing a first optical fiber with a second optical fiber, comprising:
securing the first optical fiber and the second optical fiber within an apparatus;
stripping a first coating from about the first optical fiber by a first laser beam generated by at least one laser;
stripping a second coating from about the second optical fiber via the first laser beam;
cleaving an end of the first optical fiber by a second laser beam from the at least one laser;
cleaving an end of the second optical fiber by the second laser beam;
splicing the ends of the optical fibers together by longitudinally aligning the fibers, heating the ends of the fibers with a third laser beam from the at least one laser, and pressing the ends of the fibers together, thereby creating a fused connection between the first optical fiber and the second optical fiber;
coating the fused connection with a third coating by shrink wrapping the third coating about the fused connection via a fourth laser beam generated from the at least one laser;
removing debris created during the stripping, cleaving, splicing and coating steps by regulating the airflow about the first and second optical fibers; and
removing the first and second optical fibers from within the apparatus.

20. The method of claim 19, further including:
increasing the mode field diameter of at least a select one of the first optical fiber and the second optical fiber via the second laser beam prior to splicing the fibers.

21. The method of claim 19, wherein the splicing step includes preheating the ends of the fibers via a fifth laser beam generated from the at least one laser prior to pressing the ends of the fibers together.

22. The method of claim 19, further including:
preventing the fibers from contacting the apparatus between the stripping and coating steps.

23. The method of claim 19, wherein the stripping step includes splitting the first laser beam into at least two components that impinge the first and second coatings at different locations.

24. The method of claim 19, wherein the splicing step includes splitting the third laser beam into at least two components that impinge the fused connection at different locations.

25. The method of claim 19, wherein the coating step includes splitting the fourth laser beam into at least two components that impinge the third coating at different locations.

26. A splicing apparatus for splicing optical fibers, comprising:
a clamp for retaining a first optical fiber and a second optical fiber within the splicing apparatus; and
at least one laser adapted to emit a first laser beam for stripping a coating from about the first and second optical fibers while the first and second optical fibers are retained by the clamp, a second laser beam for cleaving an end of the first optical fiber and an end of the second optical fiber while the first and second optical fibers are retained by the clamp, and a third laser beam for splicing the ends of the optical fibers together creating a fused connection therebetween while the first and second optical fibers are retained by the clamp.

27. The splicing apparatus of claim 26, wherein the at least one lasing apparatus includes a first laser adapted to emit the first laser beam and a second laser adapted to emit the second laser beam.

28. The splicing apparatus of claim 27, wherein the at least one laser includes a third laser adapted to emit the third laser beam.

29. The splicing apparatus of claim 26, wherein the at least one laser includes a single laser that is adapted to emit the second laser beam and the third laser beam.

30. The splicing apparatus of claim 29, wherein the single laser is adapted to generate the second laser beam and third laser beam at a substantially similar wavelength and at a different power level, respectively.

31. The splicing apparatus of claim 26, wherein the at least one laser is adapted to generate the first laser beam at a wavelength primarily absorbed by the coatings about the first and second optical fibers.

32. The splicing apparatus of claim 26, wherein the at least one laser is adapted to generate the third laser beam at a wavelength primarily absorbed by the first and second optical fibers.

33. The splicing apparatus of claim 26, wherein the second laser beam is adapted to cleave the ends of the first and second optical fibers at a 90° angle to a longitudinal axis thereof.

34. The splicing apparatus of claim 26, further including:
an air flow regulator adapted to remove debris from about the optical fibers.

35. The splicing apparatus of claim 26, further including:
a coating device adapted to coat the fused connection between the first and second optical fibers while the first and second optical fibers are retained by the clamp.

36. The splicing apparatus of claim 35, wherein the coating device is adapted to coat the fused connection with a polymer substance, and wherein the at least one laser is adapted to generate a fourth laser beam to shrink wrap the polymer substance about the fused connection.

37. The splicing apparatus of claim 36, wherein the at least one laser is adapted to generate the first and fourth laser beams at a substantially similar wavelength and a different power level, respectively.

* * * * *